United States Patent
Zhang

(10) Patent No.: US 7,249,360 B2
(45) Date of Patent: Jul. 24, 2007

(54) OPTICAL DISC DRIVER

(75) Inventor: Xiao-Ling Zhang, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 454 days.

(21) Appl. No.: 10/862,077

(22) Filed: Jun. 3, 2004

(65) Prior Publication Data

US 2004/0250270 A1 Dec. 9, 2004

(30) Foreign Application Priority Data

Jun. 3, 2003 (CN) ............................ 03 2 47002 U

(51) Int. Cl.
*G11B 33/02* (2006.01)
(52) U.S. Cl. ........................................... 720/610
(58) Field of Classification Search ................ 720/610, 720/613
See application file for complete search history.

(56) References Cited

U.S. PATENT DOCUMENTS 7,043,740 B2* 5/2006 Chen et al. ................. 720/610

2003/0198177 A1* 10/2003 Horimai et al. ............. 369/291
2004/0105354 A1* 6/2004 Kimura et al. ........... 369/30.36

FOREIGN PATENT DOCUMENTS

CN 93244432.6 6/1995
CN 99208855.0 2/2000

* cited by examiner

*Primary Examiner*—Allen Cao
(74) *Attorney, Agent, or Firm*—Wei Te Chung

(57) ABSTRACT

An optical disc driver includes a tray (20) and a driver housing (30). A locating cylinder (328) is formed at a rear of the driver housing. A through slot (329) is defined vertically in the middle of the locating cylinder, and divides the locating cylinder into two parts. A locating slot (228) is defined at a rear end of the tray, and an opening (229) is defined between a rear edge of the tray and the locating slot. The width of the opening is wider than that of the locating slot, and the opening broadens as it nears the rear edge of the tray, allowing the locating cylinder to be easily received and guided into the locating slot. This arrangement allows the tray to be firmly positioned in the driver housing.

20 Claims, 3 Drawing Sheets

OPTICAL DISC DRIVER

BACKGROUND OF THE INVENTION

1. Field of the Invention

The present invention relates to an optical disc driver, and more particularly to an optical disc driver having a tray which can easily and firmly mount in a driver housing of the optical disc driver.

2. Description of Related Art

A tray is used in an optical disc driver to carry an optical disc into and out of a driver housing. After the tray loads the optical disc in the driver housing, a spindle motor rotatablely drives the optical disc, and a pickup reads digital data from the optical disc. In order to get better data flow from the optical disc, the tray needs to be firmly mounted in the driver housing.

A typical example of such an arrangement is shown in China Patent No. 93244432.6, which discloses a tray located in a driver housing. A protrusive plate is stamped inwardly on a back plate of the driver housing, and a locating hole is defined in the protrusive plate. A concavity is defined on a back plate of the tray, and a plug is formed in the center of the concavity. The plug engages with the locating hole to position the tray in the driver housing. Unfortunately, the structure is too complex, and it is inconvenient for mass production. Additionally, since the materials are not flexible, when the plug engages in the locating hole, there must be a narrow gap between the plug and the locating hole. The presence of the gap allows some relative movement of the tray and the driver housing, leading to generation of some noises when a spindle motor rotates with the optical disc. Moreover, the gap also allows dust to gain entrance into the driver housing.

SUMMARY OF THE INVENTION

Accordingly, an object of the present invention is to provide an optical disc driver which provides for convenient and firm positioning of a tray in a driver housing of the optical disc driver.

Another object of the present invention is to provide a tray which can be flexibly and firmly mounted in a driver housing of the optical disc driver.

In order to achieve the objects set out above, an optical disc driver of the present invention includes a tray and a driver housing. A locating cylinder is formed at a rear of the driver housing. A through slot is defined vertically in the middle of the locating cylinder, and divides the locating cylinder into two parts. A locating slot is defined near a rear end of the tray and an opening is defined between a rear edge of the tray and the locating slot. The width of the opening is wider than that of the locating slot, and the opening broadens from the locating slot to the end of the tray, allowing the locating cylinder to be easily received and guided into the locating slot. This arrangement allows the tray to be firmly positioned in the driver housing.

Other objects, advantages and novel features of the present invention will become more apparent from the following detailed description when taken in conjunction with the accompanying drawings, in which:

DETAILED DESCRIPTION OF THE INVENTION

Figure 1:
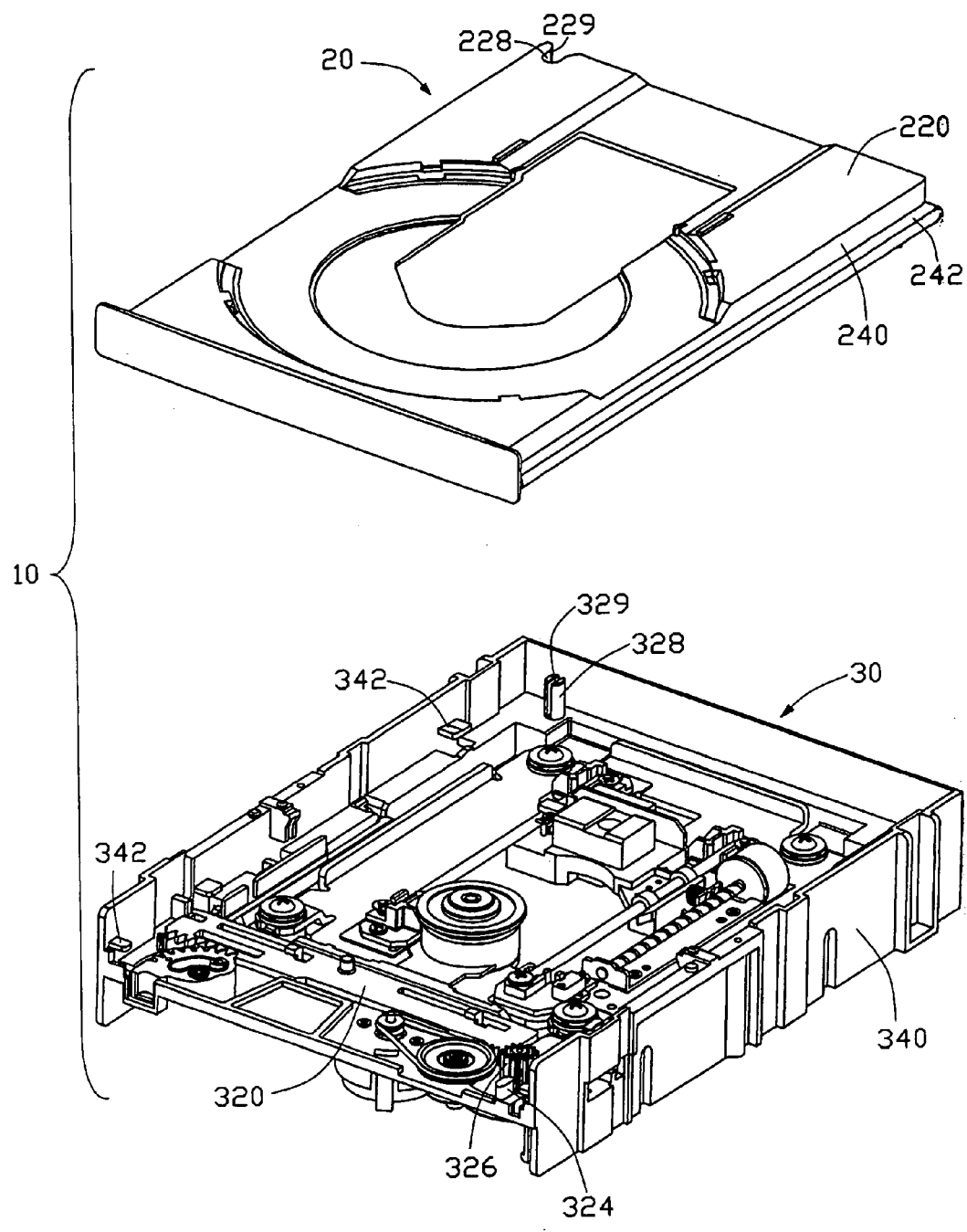
FIG. 1 is an exploded, isometric view of an optical disc driver in accordance with the present invention.

Reference will now be made to the drawing figures to describe the preferred embodiment of the present invention in detail.

Figure 2:
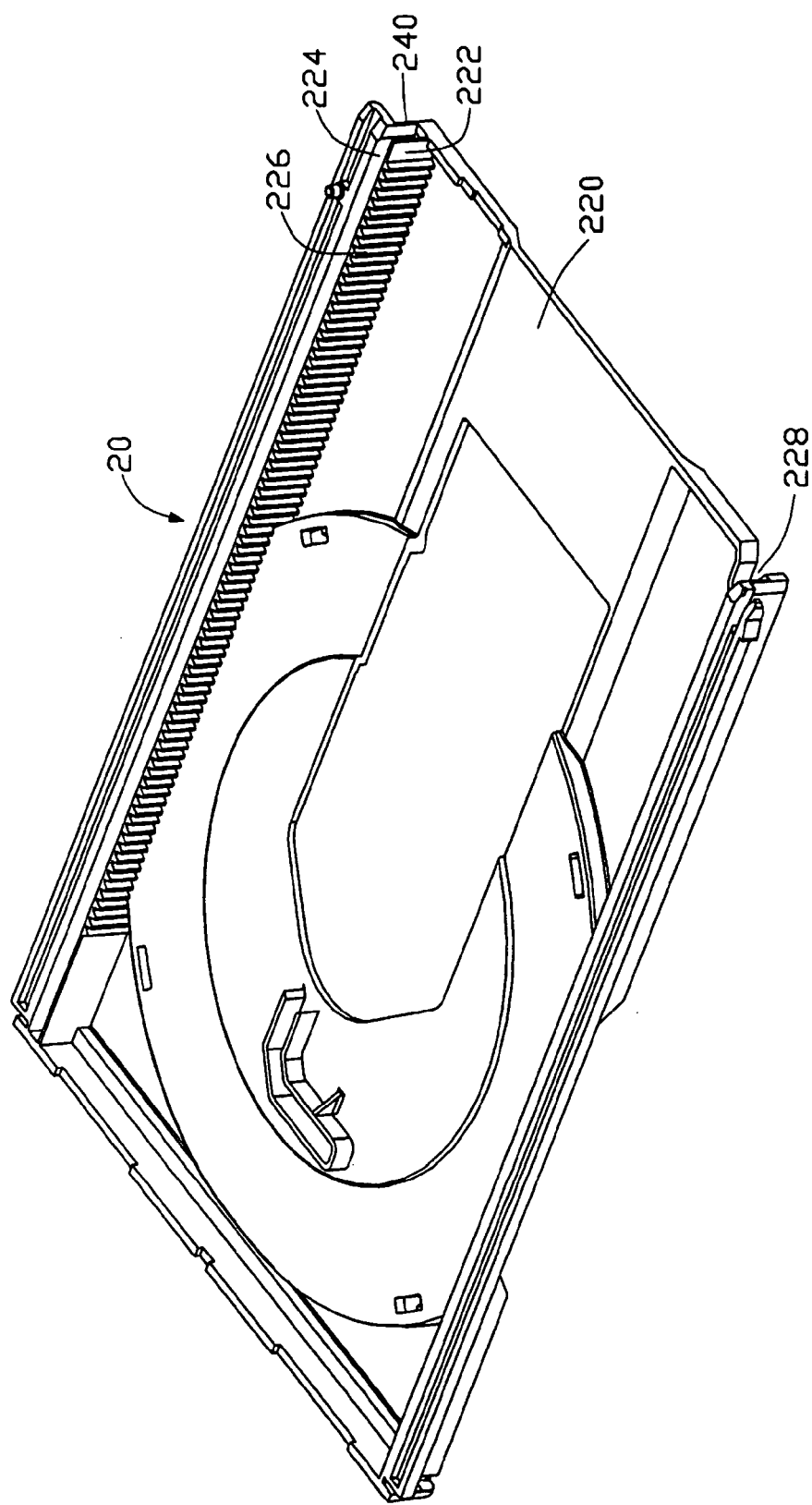
FIG. 2 is an isometric view of a back face of a tray in accordance with the present invention.

As shown in FIGS. 1–2, an optical disc driver 10 in accordance with a preferred embodiment of the present invention includes a tray 20 and a driver housing 30. The tray 20 carries an optical disc (not shown) into and out of the driver housing 30 for loading and extracting the optical disc from the optical disc driver. The driver housing 30 has a bottom plate 320 and two second side plates 340 extending from opposite side edges of the bottom plate 320. A pair of mounting plates 342 extends inwardly from each second side plate 340. The mounting plates 342 are all at a same level. A pair of guiding protrusions 324 extends upwardly from each opposite side of the bottom plate 320. Corresponding guiding protrusions 324 describe a line. A gear 326 is rotatablely attached on a front end of the bottom plate 320. The gear 326 is adjacent one side guiding protrusion 324. A locating cylinder 328 is formed at the rear of the bottom plate 320. A through slot 329 is defined vertically in the middle of the locating cylinder 328, and divides the locating cylinder 328 into two parts. The through slot 329 is parallel to the second side plates 340.

The tray 20 has a supporting plate 220 and two first side plates 240 extending downwardly from two opposite side edges of the supporting plate 220. The optical disc (not shown) can be put on the supporting plate 220. A pressing plate 242 extends outwardly and horizontally from a free end of each first side plate 240. On a bottom face of the tray 20, a guiding plate 222 is formed along one side. The guiding plate 222 has an inward face (not labeled) and an outward face (not shown) and is parallel to the first side plates 240. A guiding groove 224 is defined between the outward face (not shown) of the guiding plate 222 and the nearest first side plate 240, which guiding groove 224 cooperates with the guiding protrusions 324. A plurality of teeth 226 is formed on the inward face of the guiding plate 222 to cooperate with the gear 326. A locating slot 228 is defined at a rear end of the supporting plate 220, and an opening 229 is defined between a rearward edge (not labeled) of the tray 20 and the locating slot 228. The width of the opening 229 is wider than a width of the locating slot 228, and the opening 229 broadens from the locating slot 228 to the rearward edge of the tray 20 to allow the locating cylinder 328 to be easily received and guided into the locating slot 228.

Figure 3:
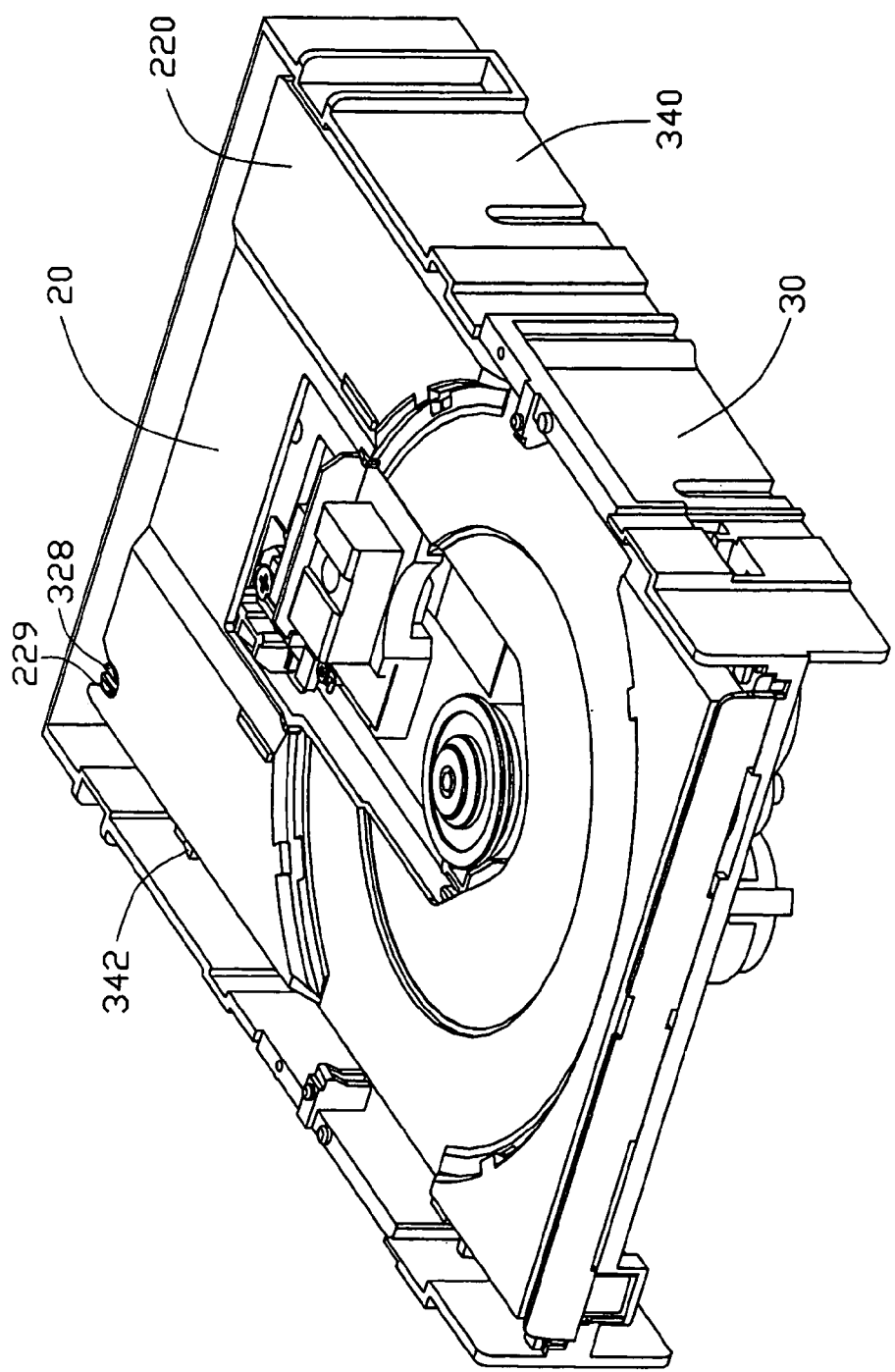
FIG. 3 is an assembled view of the present invention as shown in FIG. 1.

As shown in FIG. 3, in assembly, the guiding groove 224 and the pressing plates 242 of the tray 20 are respectively aligned with the guiding protrusions 324 and mounting plates 342 of the driver housing 30. When the tray 20 is pushed inwardly, it slides along the guiding protrusions 324 and the teeth 226 of the tray 20 engage with and turn the gear 326, so that the tray 20 slides smoothly to an end of the driver housing 30, where the locating cylinder 328 is first received in the opening 229, then elastically compresses as it moves further into the opening 229 and into the locating slot 228. Since the locating cylinder 328 is divided into two parts (not labeled) by the through slot 329, it can elastically yield to fit into the locating slot 228, allowing the locating cylinder 328 to firmly fix the tray 20 in position in the driver housing 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical disc driver, comprising:
   a tray comprising a supporting plate and two first side plates extending downwardly from two sides of the supporting plate, a locking portion arranged at an end of the tray, the locking portion comprising a locating slot and an opening; and
   a driver housing comprising a bottom plate and two second side plates formed at opposite sides of the bottom plate, a locking latch being formed on the driver housing;
   wherein the locking latch is received and guided by the opening while being elastically compressed into the locating slot to firmly position the tray in the driver housing.

2. The optical disc driver as recited in claim 1, wherein the locating slot is defined near a rear end of the tray and the opening is defined between a rear edge of the tray and the locating slot, and the opening broadens from the locating slot to the rear edge of the tray.

3. The optical disc driver as recited in claim 2, wherein a through slot is vertically defined in the middle of the locking latch, and divides the locking latch into two parts.

4. The optical disc driver as recited in claim 3, wherein the through slot is parallel with the second side plates, and the two parts can elastically bend toward the through slot when subjected to pressure.

5. The optical disc driver as recited in claim 4, wherein the locking latch is substantially a cylinder and is arranged at the end of the bottom plate.

6. The optical disc driver as recited in claim 5, wherein the locking portion is defined at the end of the supporting plate.

7. The optical disc driver as recited in claim 4, wherein a pressing plate outwardly and horizontally extends from a free end of each first side plate.

8. The optical disc driver as recited in claim 7, wherein at least a mounting plate is horizontally formed on an inside surface of each second side plate for guiding the pressing plates of the tray.

9. The optical disc driver as recited in claim 4, wherein a guiding plate is formed adjacent one first side plate on a back face of the tray, a guiding groove is defined between an outward side of the guiding plate and the first side plate, and a plurality of teeth is formed on an inward side of the guiding plate.

10. The optical disc driver as recited in claim 9, wherein at least a guiding protrusion is formed on the bottom plate of the driver housing for cooperating with the guiding groove of the tray.

11. The optical disc driver as recited in claim 9, wherein a gear is rotatablely attached on the bottom plate for cooperating with the teeth of the tray.

12. A disc driver comprising:
    a driver housing defining a locking post extending in a first direction around a rear portion thereof;
    a tray moveable relative to the driver housing along second direction perpendicular to said first direction;
    a locking portion located around a rear portion of the tray and defining a locking space which receives said locking post and imposing a force upon said locking post in a third direction perpendicular to both said first and second directions.

13. The disc driver as recited in claim 12, wherein a through slot is vertically defined in the middle of the locking post, and divides the locking post into two parts.

14. The disc driver as recited in claim 12, wherein the locking portion comprising a locating slot and an opening, the locating slot is defined near a rear end of the tray and the opening is defined between a rear edge of the tray and the locating slot, and the opening broadens from the locating slot to the rear edge of the tray.

15. A disc driver, comprising:
    a driver housing;
    a tray moveable relative to the driver housing;
    a locking portion arranged at an end of the tray; and
    a locking latch being formed on the driver housing, a through slot being defined vertically in a middle of the locking latch and dividing the locking latch into two parts, the two parts of the locking latch elastically bendable toward the through slot when the locking latch is received in the locking portion for positioning the tray in the driver housing.

16. The disc driver as recited in claim 15, wherein the through slot is parallel with a moving direction of the tray.

17. The disc driver as recited in claim 15, wherein the locking portion defines a locating slot and an opening, the locating slot is defined near a rear end of the tray and the opening is defined between a rear edge of the tray and the locating slot, and the opening broadens from the locating slot to the rear edge of the tray.

18. The disc driver as recited in claim 15, wherein the tray comprises a supporting plate and two first side plates extending downwardly from two sides of the supporting plate, a guiding plate is formed adjacent one first side plate on a back face of the tray, a guiding groove is defined between an outward side of the guiding plate and the first side plate, and a plurality of teeth is formed on an inward side of the guiding plate.

19. The disc driver as recited in claim 18, wherein the driver housing comprises a bottom plate, and at least a guiding protrusion is formed on the bottom plate of the driver housing for cooperating with the guiding groove of the tray.

20. The disc driver as recited in claim 19, wherein a gear is rotatablely attached on the bottom plate for cooperating with the teeth of the tray.

* * * * *